United States Patent
Cheong et al.

[19]

[11] Patent Number: 5,870,582
[45] Date of Patent: Feb. 9, 1999

[54] METHOD AND APPARATUS FOR COMPLETION OF NON-INTERRUPTIBLE INSTRUCTIONS BEFORE THE INSTRUCTION IS DISPATCHED

[75] Inventors: Hoichi Cheong; Hung Qui Le; John Stephen Muhich; Steven Wayne White, all of Austin, Tex.

[73] Assignee: International Business Machines Corporation, Armonk, N.Y.

[21] Appl. No.: 829,671

[22] Filed: Mar. 31, 1997

[51] Int. Cl.$^6$ ........................................................ G06F 9/38
[52] U.S. Cl. .................................... 395/394; 395/800.23
[58] Field of Search ................................... 395/391, 394, 395/800.23

[56] References Cited

U.S. PATENT DOCUMENTS

| | | |
|---|---|---|
| 4,870,614 | 9/1989 | Quatse . |
| 4,965,721 | 10/1990 | Holtey et al. . |
| 5,057,997 | 10/1991 | Chang et al. . |
| 5,301,312 | 4/1994 | Christopher, Jr. et al. . |
| 5,307,495 | 4/1994 | Seino et al. . |
| 5,335,331 | 8/1994 | Murao et al. . |
| 5,355,460 | 10/1994 | Eickemeyer et al. . |
| 5,361,356 | 11/1994 | Clark et al. . |
| 5,390,311 | 2/1995 | Fu et al. . |
| 5,404,558 | 4/1995 | Okamoto . |
| 5,440,703 | 8/1995 | Ray et al. . |
| 5,469,553 | 11/1995 | Patrick . |
| 5,481,683 | 1/1996 | Karim . |
| 5,497,317 | 3/1996 | Hawkins et al. . |
| 5,509,130 | 4/1996 | Trauben et al. . |
| 5,546,599 | 8/1996 | Song . |
| 5,548,738 | 8/1996 | Song . |
| 5,555,432 | 9/1996 | Hinton et al. ............................ 395/392 |
| 5,559,976 | 9/1996 | Song . |

OTHER PUBLICATIONS

Halfhill, Tom R., "Intel's . . . ," BYTe, Apr. 1994, pp. 42–58.
Weiss, et al., "Instruction Issue Logic in Pipelined Supercomputers", IEEE Transactions on Computers, vol. C–33, No. 11, Nov. 1984.

"The Role of Exceptional Recovery", Superscalar Microprocessor Design, 92 (1991), Chapter 5, pp. 87–102.
"Register Dataflow", Superscalar Microprocessor Design, Chapter 6, 103–126, date unknown.
Diefendortf et al, "Organization of the Motorola 88110 Superscalar RISC Microprocessor," IEEE Micro Journal, Apr., 1992, pp. 40–62, Particularly p. 49.

(List continued on next page.)

*Primary Examiner*—Richard L. Ellis
*Attorney, Agent, or Firm*—Anthony V. S. England

[57] ABSTRACT

In a method and apparatus for allocating processor resources in a data processing system, instructions are dispatched and tagged for processing. A processor resource snoops to obtain execution results for the tagged instructions. Such an instruction is logically "finished" in response to determining that it will not cause an interrupt (which includes not changing the sequence of completing instructions), and "completed" in response to finishing all earlier dispatched instructions. Information is entered for such an instructions in rename buffer in response to the instruction targeting an architected register, and such a rename buffer entry is released in response to completing the entry's instruction. The rename buffer may comprise a history buffer. Also, information for the instructions is entered in a completion queue in response to dispatching the instructions, and the queue entry for such an instruction is released in response to completion of the instruction. Also, the instructions are grouped, a group having solely a single interruptible instruction, and further including non-interruptible instructions dispatched following the interruptible instruction. Thus, there may be numerous non-interruptible instructions in such a group. Such an interruptible instruction is logically "finished" in response to determining that it will not cause an interrupt, and "completed" in response to finishing all earlier dispatched instructions. Such a non-interruptible instruction is logically "finished" and "completed" in response to completion of its associated interruptible instruction, so that such a non-interruptible instruction may complete before it is dispatched.

17 Claims, 4 Drawing Sheets

OTHER PUBLICATIONS

"Logically Deleted Parts," IBM Technical Disclosure Bulletin, vol. 32, No. 3B, Aug. 1989, pp. 280–287.

"Trace–Directed Program Restructuring for Both Pinned and Pageable Instructions", IBM Technical Disclosure Bulletin, vol. 37, No. 02B, Feb. 1994, pp. 667–668.

"Grouping of Instructions", IBM Technical Disclosure Bulletin, vol. 38, No. 08, Aug. 1995, pp. 531–533.

METHOD AND APPARATUS FOR COMPLETION OF NON-INTERRUPTIBLE INSTRUCTIONS BEFORE THE INSTRUCTION IS DISPATCHED

FIELD OF THE INVENTION

This invention relates generally to data processing systems and more specifically applies to recovery mechanisms for such systems, particularly where the system includes a processor that is superscalar or has a pipelined execution unit.

CROSS REFERENCE TO RELATED PATENT APPLICATIONS

This patent is related to the following earlier filed applications, which are assigned to the assignee of the present application and which are hereby incorporated herein by reference:

METHOD AND APPARATUS FOR IMPROVED RECOVERY OF PROCESSOR STATE USING HISTORY BUFFER, U.S. patent application Ser. No. 08/729,307, filed Oct. 15, 1996;

METHOD AND APPARATUS FOR WRITING INFORMATION TO REGISTERS IN A DATA PROCESSING SYSTEM USING A NUMBER OF REGISTERS FOR PROCESSING INSTRUCTIONS, U.S. patent application Ser. No. 08/729,308, filed Oct. 15, 1996; and METHOD AND APPARATUS FOR CONDENSED HISTORY BUFFER, U.S. patent application Ser. No. 08/729,309, filed Oct. 15, 1996.

This patent is related to the following applications filed on the same date herewith, which are assigned to the assignee of the present application and which are hereby incorporated herein by reference:

ISSUING INSTRUCTIONS IN A PROCESSOR SUPPORTING OUT-OF-ORDER EXECUTION, U.S. patent application Ser. No. 08/829,662 filed Mar. 31, 1997;

DISPATCHING INSTRUCTIONS IN A PROCESSOR SUPPORTING OUT-OF-ORDER EXECUTION, U.S. patent application Ser. No. 08/829,663 filed Mar. 31, 1997;

FAST UNIFIED INTERRUPT RECOVERY, INCLUDING BRANCH RECOVERY, SUPPORTING OUT-OF-ORDER EXECUTION, U.S. patent application Ser. No. 08/829,667 filed, Mar. 31, 1997;

PROCESSING SYSTEM AND METHOD FOR DETERMINING AN INSTRUCTION ORDER USING AN INSTRUCTION IDENTIFIER, U.S. patent application Ser. No. 08/829,529, filed Mar. 31, 1997.

BACKGROUND OF THE INVENTION AND PRIOR ART

High performance processors currently used in data processing systems today may be capable of superscalar operation and may have pipelined elements. A superscalar processor has multiple elements which operate in parallel to process multiple instructions in a single processing cycle. Pipelining involves processing instructions in stages, so that the pipelined stages may process a number of instructions concurrently.

In a typical first stage, referred to as an instruction fetch stage, an instruction is fetched from memory. Then, in a decode stage, the instruction is decoded into different control bits, which in general designate i) a type of functional unit for performing the operation specified by the instruction, ii) source operands for the operation and iii) destinations for results of operations. In a dispatch stage, the decoded instruction is dispatched per the control bits to a unit having an execution stage. This stage processes the operation as specified by the instruction. Executing an operation specified by an instruction includes accepting one or more operands and producing one or more results.

While instructions may originally be prepared for processing in some programmed, logical sequence, it should be understood that for concurrent processing of multiple instructions, the instructions may be processed, in some respects, in a different sequence. However, since instructions are not totally independent of one another, complications arise. That is, the processing of one instruction may depend on a result from another instruction. For example, the processing of an instruction which follows a branch instruction will depend on the branch path chosen by the branch instruction. In another example, the processing of an instruction which reads the contents of some memory element in the processing system may depend on the result of some preceding instruction which writes to that memory element.

As these examples suggest, if one instruction is dependent on a first instruction and the instructions are to be processed, concurrently or the dependent instruction is to be processed before the first instruction, an assumption must be made regarding the result produced by the first instruction. The state of the processor, as defined at least in part by the content of registers the processor uses for execution of instructions, may change from cycle to cycle. If an assumption used for processing an instruction proves to be incorrect then, of course, the result produced by the processing of the instruction will almost certainly be incorrect, and the processor state must recover to a state with known correct results up to the instruction for which the assumption is made. (Herein, an instruction for which an assumption has been made is referred to as an "interruptible instruction", and the determination that an assumption is incorrect, triggering the need for the processor state to recover to a prior state, is referred to as an "interruption" or an "interrupt point".) In addition to incorrect assumptions, there are other causes of such interruptions requiring recovery of the processor state. Such an interruption is generally caused by an unusual condition arising in connection with instruction execution, error, or signal external to the processor.

A "completion" stage deals with program order issues that arise from concurrent execution, wherein multiple, concurrently executed instructions may deposit results in a single register. It also handles issues arising from instructions subsequent to an interrupted instruction depositing results in their destination registers. In connection with the prior art completion stage, information about instructions is typically kept in dispatch order in a completion buffer (also known as a reorder buffer) so that the instructions can be reordered in dispatch order after having been executed out of order. Also, the results of instruction execution are temporarily held in one or more backup buffers (also known as rename buffers). Once it is known that such execution results are committed they are ultimately written back to architected registers in accordance with the sequence of instructions in the completion buffer. After execution results corresponding to completion buffer entries have been written back to architected registers from rename buffers, completion and rename buffer entries are then released so that they can be filled with information for subsequently dispatched instructions.

Figure 1:
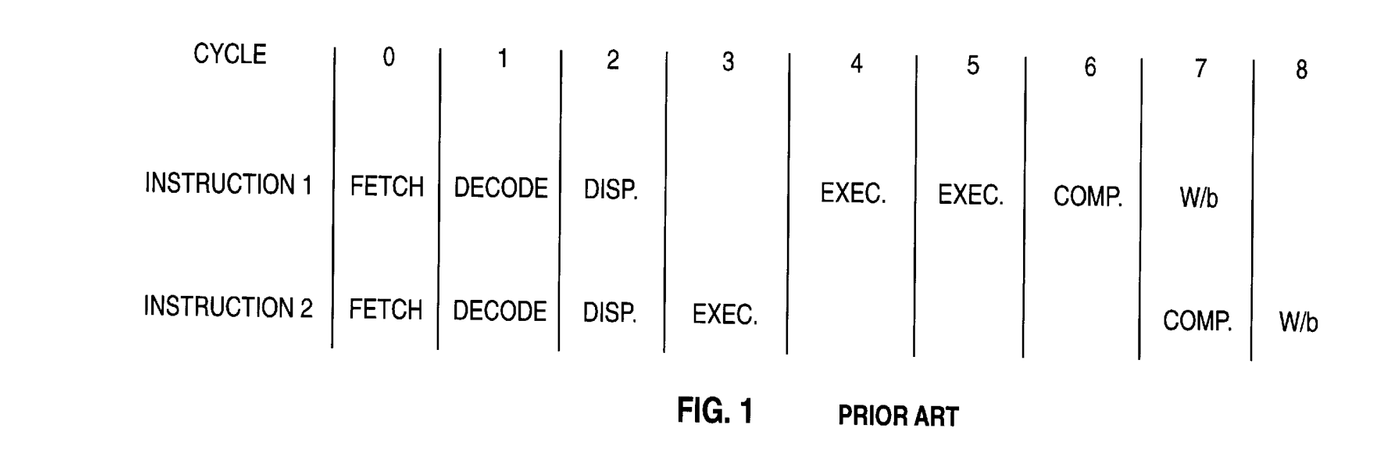
FIG. 1 (prior art) illustrates certain timing aspects of dispatching, completion and writeback for two exemplary instructions.

Certain timing aspects of the above described dispatching, completion and writeback are shown in FIG. 1 for two exemplary instructions. In the example, the two instructions are fetched, decoded and dispatched in corresponding cycles. It is assumed in the example that the second instruction is not dependent on the first instruction for its source operand, and that the second instruction executes more quickly than the first. Nevertheless, completion of the second instruction requires execution and completion of the first. So, FIG. 1 shows completion and writing back of the second instruction being held up until execution and completion of the first. Instruction 2 executes in cycle 3, but a number of cycles are spent before the first instruction is executed. This could be due to waiting for data access, branch resolution, etc. Then, in cycle 6 of the example, instruction 1 completes. In response, instruction 2 completes. In the example, instruction 2 is shown completing in cycle 7, although it is understood that it might be possible, in a machine that has the capability to complete numerous instructions in a single cycle, for instruction 2 to complete in cycle 6 in response to the completion in that same cycle of instruction 1. The instructions are shown writing back results of execution in cycles 7 and 8 respectively.

As the example illustrates, the present method and apparatus for dispatching, completing and writing back instructions may delay release of completion and rename buffer entries for a second instruction, due to waiting for execution and completion of a preceding instruction. This may delay dispatching of subsequent instructions. Therefore a need exists for improving the method and apparatus for processing instructions.

SUMMARY OF THE INVENTION

An objective of the invention is to reduce constraints on instruction completion.

It is another objective to reduce resources which are tied up in connection with awaiting instruction completion.

According to the present invention, the foregoing and other objects are attained by a method and apparatus in a data processing system for allocating processor resources. Instructions are dispatched and tagged for processing. A processor resource snoops to obtain execution results for the tagged instructions. Such an instruction is logically "finished" in response to determining that it will not cause an interrupt (which includes not changing the sequence of completing instructions), and "completed" in response to finishing all earlier dispatched instructions.

In a further aspect, the snooping resource may comprise an architected register, a rename buffer, and a reservation station. The rename buffer may comprise a history buffer.

The instructions may include load instructions and store instructions (which are interruptible). Execution of a load instruction loads an operand for the instruction from memory to an architected register and may load the operand temporarily in a rename buffer, including a history buffer, while execution of a store instruction stores an operand to memory. According to the embodiment, a load instruction may complete before the operand is available for loading to the register or buffer, and a store instruction may complete before its operand is available for storing to memory.

In another aspect, information is entered for such an instruction in a rename buffer in response to the instruction targeting an architected register, and such a rename buffer entry is released in response completing the entry's instruction. The rename buffer may comprise a history buffer.

In still further aspects, the information is entered in the history buffer also in response to whether the instruction is among selected ones of the dispatched instructions, so that in the instance of a noninterruptible instruction for which no history buffer information is entered, an architected register may be the sole resource devoted to the instruction after an execution unit has executed the instruction.

Also, information for the instructions is entered in a completion queue in response to dispatching the instructions, and the queue entry for such an instruction is released in response to completion of the instruction. The releasing of the completion queue entry is independent of writing the instruction's result to the resource.

In further aspects, the instructions are grouped, a group having solely a single interruptible instruction, and further including non-interruptible instructions dispatched following the interruptible instruction with no intervening dispatched interruptible instruction. Thus, there may be numerous non-interruptible instructions in such a group. Such an interruptible instruction is logically "finished" in response to determining that it will not cause an interrupt, and "completed" in response to finishing all earlier dispatched instructions. Such a non-interruptible instruction is logically "finished" and "completed" in response to completion of its associated interruptible instruction, which allows such a non-interruptible instruction to complete before it is dispatched.

In still further aspects, information for the instructions is entered in a rename buffer in response to the instructions targeting an architected register, and the rename buffer entries are released for the instructions in such a group in response to completing the interruptible instruction of the group.

In additional aspects, information is entered in a completion queue solely for the instructions which are interruptible, in response to dispatching the instructions. (A queue which serves at least some of the functions of a traditional completion queue, but which is compressed, i.e., containing entries solely for interruptible instructions, may be referred to herein, and in the related applications, as an interruptible instruction table ("IIT"). The detailed description which follows will clarify differences between a traditional completion queue and the IIT. It should be understood that references herein to a completion queue are generally intended to include an IIT.) The completion queue buffer entry is released for such an interruptible instruction in response to its completion. The information entered in the completion queue includes an address for the interruptible instruction. The instructions of the group with which the interruptible instruction is associated are refetched in response to the address in the completion queue for the interruptible instruction and further in response to the instruction's interruption.

It is an advantage of the present invention that an instruction may execute after its completion, and its completion queue entry may be deallocated in response to the instruction's completion, independently of writing the execution result to a processor resource such as an architected register, history buffer, or queue associated with a reservation station.

It is an another advantage that noninterruptible instructions may complete before their dispatch.

It is yet another advantage that in the instance of a noninterruptible instruction for which no history buffer entry is allocated, an architected register may be the sole resource devoted to the instruction after an execution unit has executed the instruction.

Additional objects, advantages, and novel features are set forth in the following description, or will be apparent to those skilled in the art or those practicing the invention. Other embodiments are within the spirit and scope of the invention. These objects and embodiments may be achieved by the combinations pointed out in the appended claims. The invention is intended to be limited only as defined in the claims.

DESCRIPTION OF THE PREFERRED EMBODIMENT

To clearly point out novel features of the present invention, the following discussion omits or only briefly describes conventional features of information processing systems which are apparent to those skilled in the art. It is assumed that those skilled in the art are familiar with superscalar processors. And in particular with such processors which operate in an in-order dispatch, out-of-order execution, in-order completion fashion.

Figure 2:
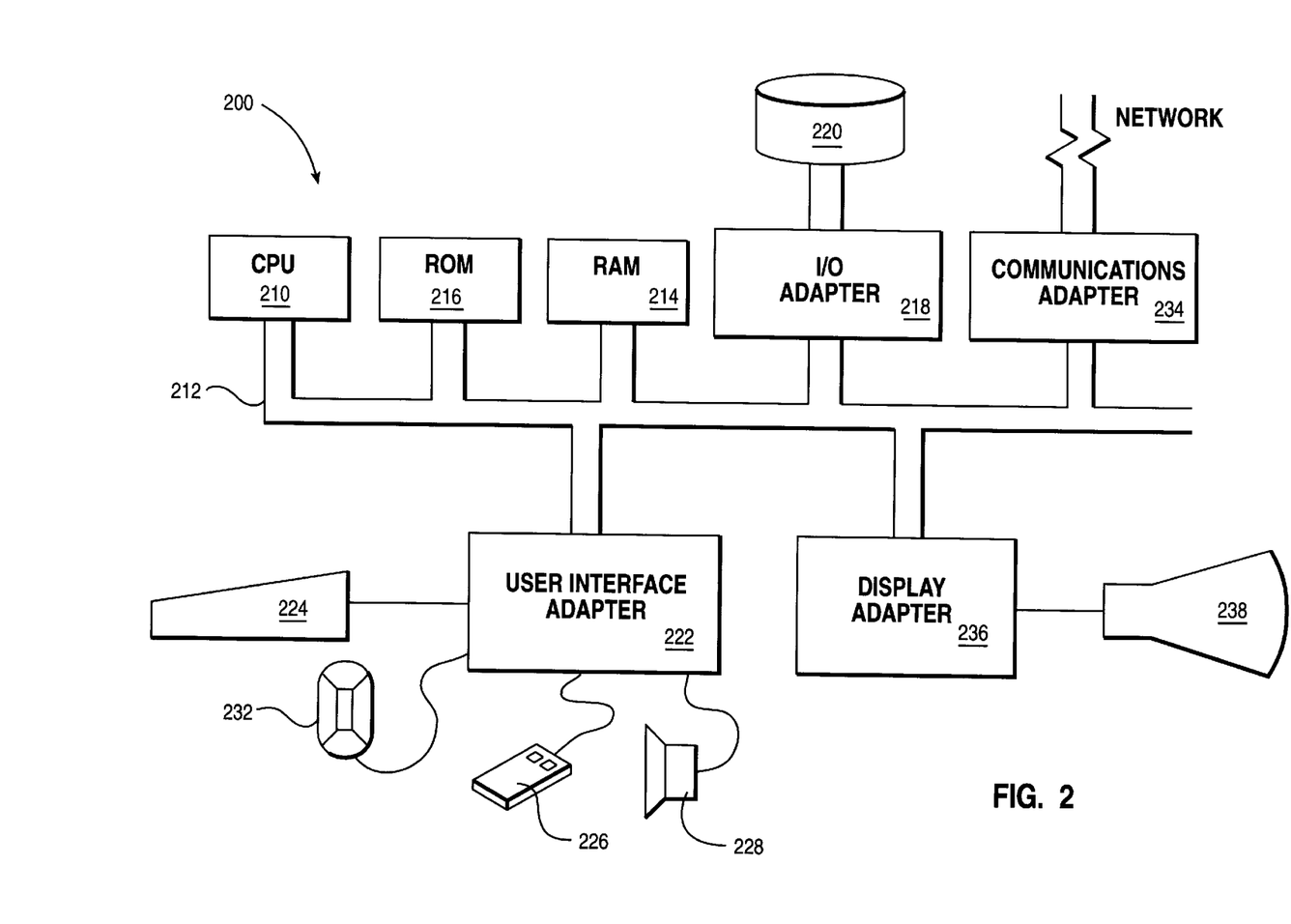
FIG. 2 is a block diagram of a data processing system for a preferred embodiment of the present invention.

Referring to FIG. 2, an example is shown of a data processing system 200 which may be used for the invention. The system has a central processing unit (CPU) 210, such as a PowerPC microprocessor ("PowerPC" is a trademark of IBM Corporation) according to "The PowerPC Architecture: A Specification for a New Family of RISC Processors", 2d edition, 1994, Cathy May, et al. Ed., which is hereby incorporated herein by reference. A more specific implementation of a PowerPC microprocessor is described in the "PowerPC 604 RISC Microprocessor User's Manual", 1994, IBM Corporation, which is hereby incorporated herein by reference. The history buffer (not shown) of the present invention is included in CPU 210. The CPU 210 is coupled to various other components by system bus 212. Read only memory ("ROM") 216 is coupled to the system bus 212 and includes a basic input/output system ("BIOS") that controls certain basic functions of the data processing system 200. Random access memory ("RAM") 214, I/O adapter 218, and communications adapter 234 are also coupled to the system bus 212. I/O adapter 218 may be a small computer system interface ("SCSI") adapter that communicates with a disk storage device 220. Communications adapter 234 interconnects bus 212 with an outside network enabling the data processing system to communication with other such systems. Input/Output devices are also connected to system bus 212 via user interface adapter 222 and display adapter 236. Keyboard 224, track ball 232, mouse 226 and speaker 228 are all interconnected to bus 212 via user interface adapter 222. Display monitor 238 is connected to system bus 212 by display adapter 236. In this manner, a user is capable of inputting to the system throughout the keyboard 224, trackball 232 or mouse 226 and receiving output from the system via speaker 228 and display 238. Additionally, an operating system such as AIX ("AIX" is a trademark of the IBM Corporation) w is used to coordinate the functions of the various components shown in FIG. 2.

The CPU (or "processor") 210 includes various registers, buffers, memories, and other units formed by integrated circuitry, and operates according to reduced instruction set computing ("RISC") techniques. The CPU 210 processes according to cycles, synchronized, in some aspects, to an internal clock (not shown).

In the following, emphasis is placed on interruptions arising from speculative execution of instructions. However, as mentioned previously, an interruption may also be caused by an unusual condition arising in connection with instruction execution, error, or signal external to the processor 210. For example, such an interruption may be caused by 1) attempting to execute an illegal or privileged instruction, 2) executing an instruction having an invalid form, or an instruction which is optional within the system architecture but not implemented in the particular system, or a "System Call" or "Trap" instruction, 3) executing a floating-point instruction when such instructions are not available or require system software assistance, 4) executing a floating-point instruction which causes a floating-point exception, such as due to an invalid operation, zero divide, overflow, underflow, etc., 5) attempting to access an unavailable storage location, including RAM 214 or disk 220, 6) attempting to access storage, including RAM 214 or disk 220, with an invalid effective address alignment, or 7) a System Reset or Machine Check signal from a device (not shown) directly connected to the processor 210 or another device in the system 200 connected to the processor 210 via the bus 212. These conditions are discussed further in the above references, "The PowerPC Architecture: A Specification for a New Family of RISC Processors", and "PowerPC 604 RISC Microprocessor User's Manual".

Figure 3:
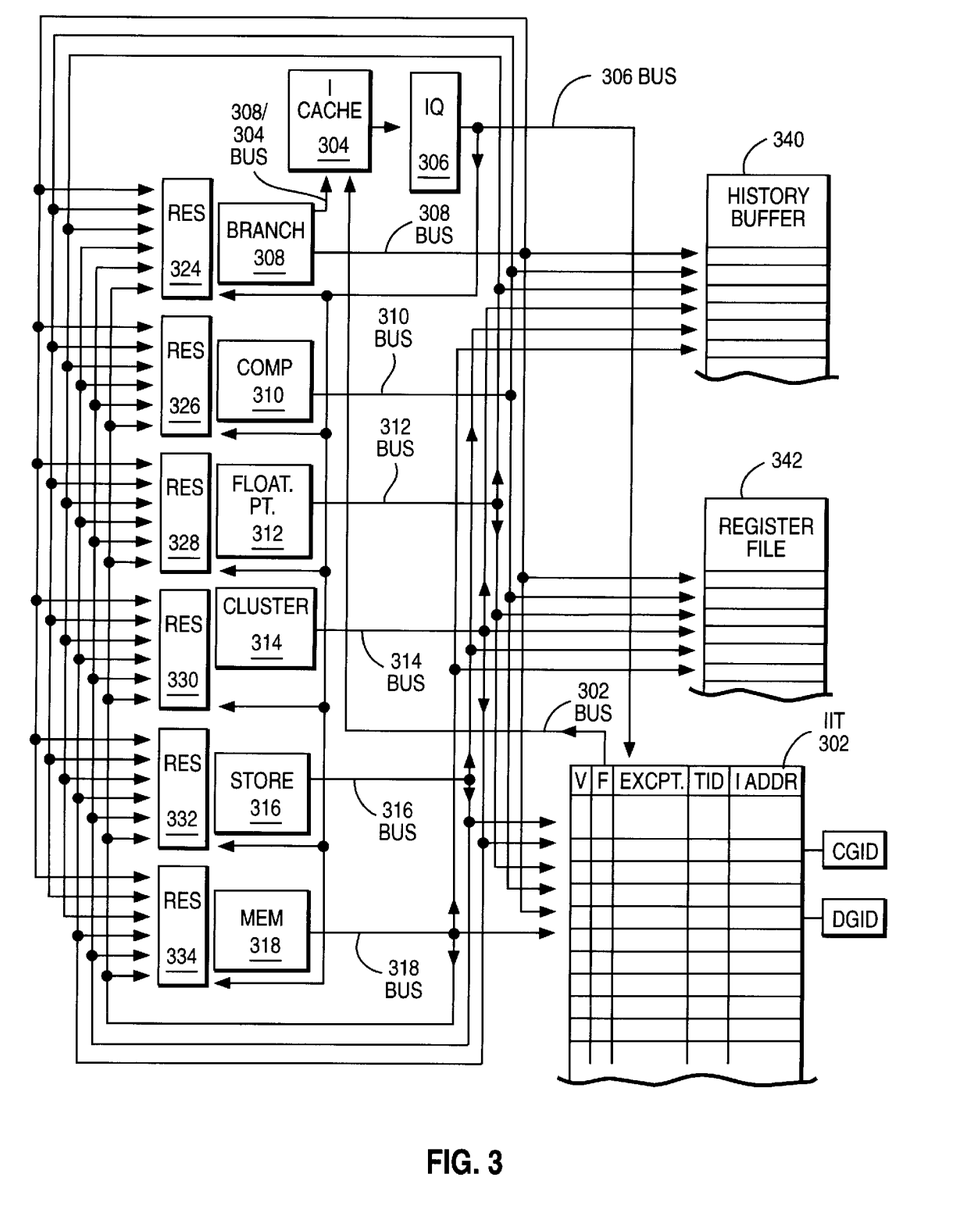
FIG. 3 is a block diagram of certain elements of a CPU for the preferred embodiment.

Referring to FIG. 3, a block diagram is shown for certain aspects of a CPU 210 and an interruptible instruction table ("IIT") 302 (also referred to as an "interrupt stack") of the preferred embodiment of the invention. (Note that herein a numbered element is numbered according to the figure in which the element is introduced, and is referred to by that number throughout succeeding figures.) The IIT serves certain functions of the prior art completion buffer, therefore the IIT and completion buffer have similarities, although there are also significant differences therebetween.

A fetch unit (not shown) fetches instructions from instruction cache 304 into the instruction queue 306, either based on a normal sequence of the instructions or, in the case of a sequence having a conditional branch instruction, a predicted sequence. A decoder unit (not shown) decodes the instructions and a dispatch unit (not shown) dispatches them to appropriate execution units 308 through 318 (also referred to as functional units) via reservation stations 324 through 334 associated with the execution units. (Note that in one or more of the related applications, information dispatched to a reservation station is described as being stored in a pre-execution queue, or a store pre-execution queue. The reservation stations herein include the queues and issue logic.)

Figure 4:
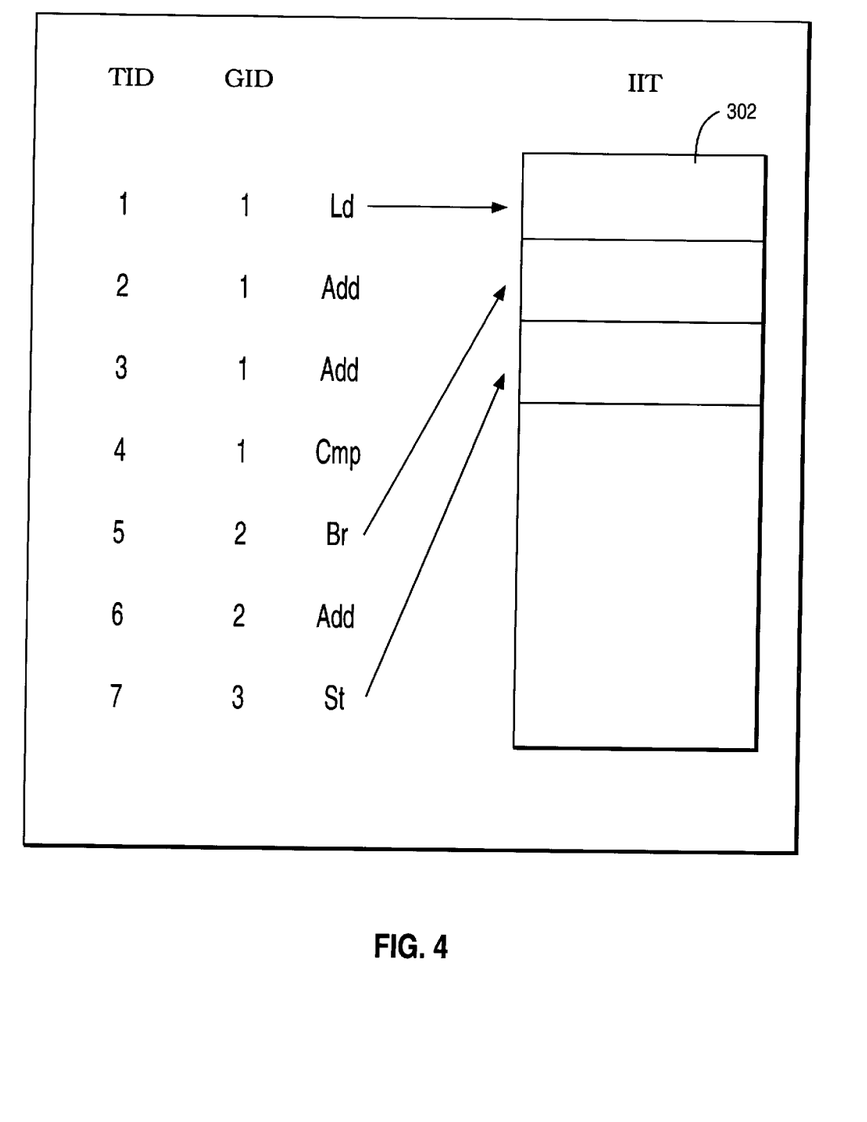
FIG. 4 illustrates creation of an Interruptible Instruction Table of the present invention.

A sequence of instructions Ld, Add, Add, Cmp, etc, is shown in FIG. 4 to illustrate aspects of an embodiment of the invention, including assigning identifiers which are associated with dispatched instructions, and creating entries in the IIT 302 for the dispatched instructions.

In connection with being dispatched, an instruction is assigned an instruction target identifier ("TID"), sometimes also referred to as a transaction identifier. The TID's are numerically monotonic with respect to the sequence in which the instructions are dispatched, so that the relative sequence in which instructions are dispatched may be inferred from the TID's assigned to the instructions. This aspect of the relationship between the TID's and instructions is useful for restoring the processor state in the event of an interrupt, and replaces one of the functions of a completion buffer, i.e, the function of identifying the order of instructions. One or more embodiments for using the TID's in restoring processor state are described in one or more of the related applications cross referenced above.

In the example illustrated in FIG. 4, the instructions are dispatched in the sequence shown from top to bottom: Ld, Add, Add, Cmp, etc. Accordingly, TID's are assigned as indicated, where the first dispatched instruction (the "Ld" instruction) is assigned the lowest TID value in the sequence, TID "1", the second dispatched instruction is assigned the next relatively higher TID value, TID "2", etc.

More than one TID is assigned to an instruction if the instruction targets more than one architected register. For each instruction that targets an architected register, the one or more TID's assigned to the instruction each correspond to one of the targeted registers. (According to the terminology used herein, when an instruction performs an operation affecting the contents of a register, the operation is said to "target" that register, the instruction may be referred to as a "targeting instruction", and the register is referred to as a "target register" or a "targeted register". For example, the instruction "ld r3, . . . " targets register r3, and r3 is the target register for the instruction "ld r3, . . .")

The unique correspondence between TID's, instructions and targeted registers is useful to enable snooping in connection with issuing an instruction for execution, where the execution requires, as a source operand, a result from a executing a previous instruction. It also enables such snooping to replace aspects of the prior art method of using a completion buffer and pointer to order the writeback of execution results.

Various details of this information flow and snooping are described in the above cross referenced related patent applications; however, certain aspects described therein which are particularly relevant to the present invention are repeated herein, together with new and nonobvious aspects.

Referring again to FIG. 3, upon dispatch of an instruction, packages of information concerning the instruction are created and sent to various resources such as the IIT 302, and other resources, such as the history buffer 340, architected register file 342, and reservation stations 324, etc. The information varies according to the resource and the instruction. A common feature of this information, however, is the TID, which facilitates broadcasting of results on the functional unit buses 308bus through 318bus, and snooping by the resources on the buses, such as history buffer 340, registers 342, IIT 302, and reservation stations 324, etc.

It should be understood that, as the term is used here, a history buffer is a type of rename buffer. In the terminology herein, a rename buffer is for storing operands intended for architected registers. The term "history buffer" implies that the architected registers contain execution results for instructions dispatched more recently, whereas the rename buffer holds results for instructions dispatched relatively earlier. That is, the use of the term "history buffer" implies that the corresponding architected registers include information for a current or future state of the processor, which may not yet be committed, while the buffer contains information for current or past states. This is in contrast to an alternative wherein the rename buffer contains information for a future state, while the architected registers contain information for a current, committed state. The embodiment herein is described in terms of a history buffer, but it should be understood by those of ordinary skill in the field of computer architecture that certain aspects of the disclosure herein are applicable to the alternative application of rename buffers.

Instructions are dispatched for an appropriate execution unit (see 308 through 318 in FIG. 3), depending on their op code. For example, a branch instruction is dispatched to a branch unit 308, a store instruction is dispatched to a store unit 316, a fixed point instruction, including a load instruction, is dispatched to a "cluster" unit 314, etc. In connection with this dispatching, a package of information is also immediately sent to the reservation station associated with the execution unit. This information includes the op code, TID number of the instruction and, if applicable, TID numbers of earlier dispatched instructions which will generate source operands for the instruction. Similar information, including the TID of the instruction, is also immediately sent to the architected register file 342 if the instruction targets an architected register, and to the history buffer 340 in certain cases where the instruction targets an architected register.

As an instruction is executed, its result is broadcast on its execution unit bus with its TID. Any of the resources which are waiting for that result (this will be indicated, at least in part, by such a resource holding the instruction's TID) will snoop the needed result on the execution unit bus 318bus, etc. Thus, an execution result is merely broadcast, and will be read by an architected register 342 if the register has the TID for the instruction which was executed to produce that result. Likewise, the result will be snooped by a reservation station 324, etc. if the station has the TID, which will be the case if the reservation station is holding an instruction to be issued for execution and the instruction it is holding needs the result for a source operand. And, the result will be snooped by the history buffer if the history buffer 340 has the TID, and so on.

Implications of this architecture are numerous. One consequence is that the committed state of the processor does not necessarily reside in the architected registers. Also, writeback is not governed by a completion buffer. According to the architecture of the present invention, although the IIT does not govern writeback, it does serve some of the functions of the prior art completion buffer, as stated earlier herein. For example, the IIT holds instruction addresses in case of an interrupt. Also, the IIT helps control the processor committed state with respect to keeping track of the TID/ GID association and its gating effect on the release of HB entries.

The sending of information to or creation of information in the IIT 302 is illustrated conceptually in FIG. 4, where a first, second and third entry are shown to receive information for the first, fifth and seventh instruction dispatched, which are the interruptible instructions shown in FIG. 4.

The IIT is implemented as a queue having first-in-first-out ordering. In connection with a TID for an instruction being entered into the IIT, a group identifier ("GID") is assigned for that instruction's entry, indicating the order of dispatch, which corresponds to the order of the interruptible instruction entry in the IIT. The TID's and GID's are shown conceptually in FIG. 4 beside the op codes for the instructions.

The dispatched interruptible instruction GID's are kept track of by a dispatch GID pointer, shown in FIG. 3 as pointer "DGID". As has been described, instructions are dispatched and completed in order, and the IIT 302 is implemented as a first-in, first-out queue. Thus, the buffer locations in the IIT are ordered in a sequence, and each dispatched interruptible instruction is entered into a buffer location next in sequence following the immediately preceding dispatched interruptible instruction. (Of course, issues arise for entries at each end of the buffer, wherein the sequence of entries must wrap around. Implementation of a FIFO queue which accounts for these issues will be understood by those of ordinary skill in the art.) Likewise, with each succeeding dispatched interruptible instruction the DGID is updated so that it points to the next succeeding IIT location and also indicates the GID value assigned to the instruction corresponding to that location.

Noninterruptible instructions, while they do not have entries in the IIT, will nevertheless have an association with a GID. That is, when a noninterruptible instruction is dispatched, the GID of the immediately preceding dispatched interruptible instruction will become associated with the noninterruptible instruction. For example, the interruptible instructions shown in FIG. 4 are the first, fifth and seventh dispatched instructions, Ld, Br, and St. Therefore, GID 1 will be associated with the first through fourth dispatched instructions, GID 2 will be associated with the fifth and sixth dispatched instructions, and GID 3 will be associated with the seventh dispatched instruction. Aspects of this association between an interruptible instruction and succeeding noninterruptible instructions are kept track of in the history buffer, for example, as described in one or more of the above cross referenced patent applications.

Referring again to FIG. 3, additional details of the IIT 302 are illustrated. Creating an IIT entry for a dispatched instruction includes entering the TID number for the instruction. It also includes allocating one of the buffer locations in the IIT by setting for that location one control bit, shown as a w valid bit, or "V" bit, to indicate that the buffer location has now been allocated and is therefore now valid, and another control bit, shown as a finished bit, or "F" bit, to indicate that the entry is associated with an instruction which has not yet "finished", as that term will be further described herein. Also, as part of creating an entry, the address of the dispatched instruction is entered for the allocated buffer location, as shown at field "I Addr" in FIG. 3. The address is included for an entry so that the instruction can be refetched from that address in the event of an interrupt.

Prior to performing all of the operations specified by an instruction's op code, an instruction's assigned execution unit, such as one of units 308 through 318, will check for interrupt conditions associated with the instruction, and send a "finish" report to the IIT 302 indicating the result of the checking, which may result in an interrupt condition. For example, for a load or store instruction, the cluster unit 314 or store unit 316 checking will include translating a memory location specified by the instruction's source or destination operand, but will not include actually waiting for data to return from or write to storage. If the specified memory location is undefined, or otherwise erroneous, an interrupt will be triggered. For a conditional branch instruction, the branch unit 308 checking will include resolving the branch path and determining if an incorrect branch path prediction occurred, in which case an interrupt will be triggered so that instructions on the incorrect branch path, which were previously speculatively executed, will be cancelled.

The IIT 302 receives the finish report for the instruction and enters it in the exception field for the instruction's IIT entry. In the embodiment, the exception field is a 5 bit field. If there is no interruption called for, as detected by the checking, then the finish report returned by the execution unit indicates "00000". Other examples of finish reports include "10000" for a data storage interrupt, "00001" for a mispredicted branch path, "00010" for a machine check interruption, "01110" for a floating point exception (underflow, overflow, etc.), and "00100" for a privileged instruction exception.

In response to a finish report for an instruction being sent to the IIT, the F bit for the instruction will be set to indicate the instruction has finished. Thus, the instruction will finish independently of performing all of the operations specified by the instruction's op code, since it finishes in response to checking which occurs prior to performing all the specified operations.

Another pointer, the completion GID pointer shown in FIG. 3 as pointer "CGID", points at the most recently dispatched instruction in the IIT which has "completed". Conditions for such completion of an interruptible instruction are 1) that the instruction itself is finished, as indicated by the F bit for the instruction, and 2) that all the preceding dispatched interruptible instruction are finished, as indicated by each of their respective F bits, or by their absence from the IIT (which indicates that they have not only finished but also have completed, as will be understood from the discussion of deallocating entries in the IIT which follows). Thus, the interruptible instruction not only finishes, but also completes independently of its execution, i.e., it completes in response to the finish report which is generated prior to the execution unit performing the operation specified by the instruction's op code.

The CGID pointer points at the entry in the IIT for the most recently completed instruction, and is updated as follows. At intervals, such as clock cycles, the F bit of the current instruction (i.e., the instruction corresponding to the next entry following the one currently pointed to by CGID pointer) is checked if its V bit is set, indicating it is valid. If the F bit indicates that the current instruction is finished, then the instruction is considered complete. In response to completion of the current instruction, the IIT entry for the instruction is deallocated by resetting the V bit of the IIT location for the entry to indicate that the location no longer has a valid entry. Also in response to determining completion of the current instruction, the next valid entry in the IIT, which corresponds to the immediately succeeding dispatched instruction, is also checked for completion, possibly during the same processing cycle, by checking its F bit. If this entry is also complete, the pointer is advanced to the entry, and the next valid entry is checked for completion, and so on, until the pointer advances to the last entry in the sequence which is complete.

Figure 5:
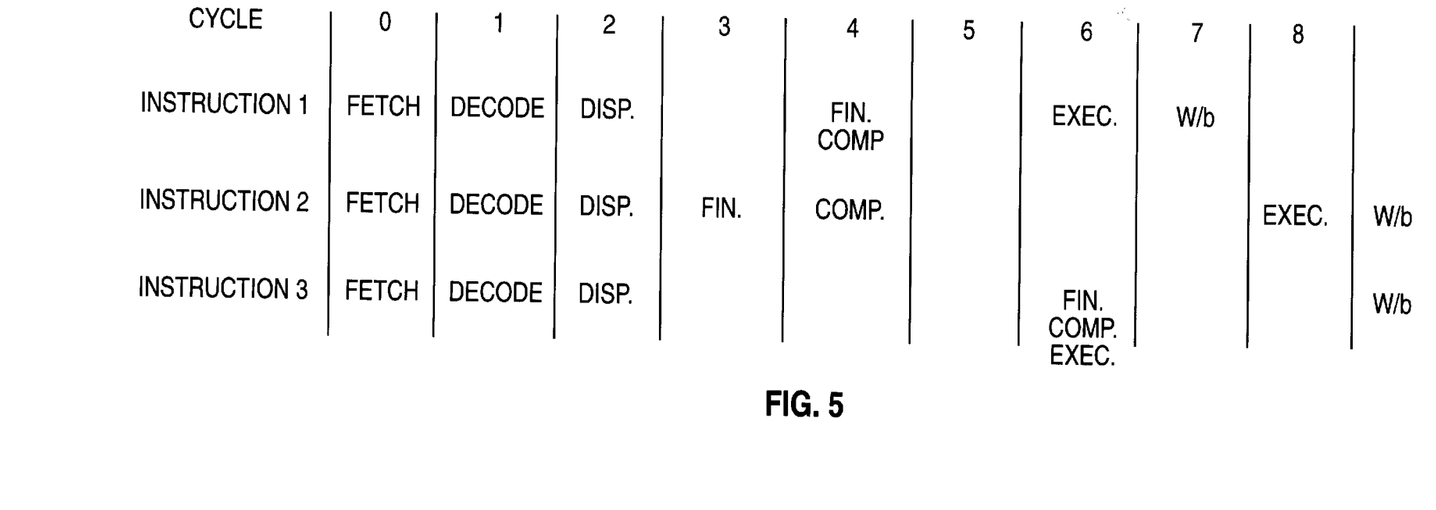
FIG. 5 illustrates certain timing aspects of dispatching, completion and writeback for exemplary instructions according to the preferred embodiment.

Aspects of this completion tracking are illustrated further in FIG. 5, which shows a sequence of completion for a number of instructions. Three exemplary instructions are shown, which are all fetched, decoded and dispatched in the first three cycles illustrated. In the example, instructions 1, 2 and 3 finish in cycle numbers 4, 3 and 6 respectively. Although instruction 2 is finished in cycle 3, it cannot completed until instruction 1 finishes, so instruction 2 does not complete until cycle 4, when instruction 1 has finished. In cycle 4, the CGID, which in the example would initially point ahead of the IIT entry for instruction 1, will be incremented in response to instruction 1's completion so that it points to instruction 1. Since instruction 2 has also finished by the time of cycle 4, in response to checking the F bit for instruction 2 the CGID will be incremented again to point to instruction 2. This may possibly occur also during cycle 4.

Since instruction 3 has not yet finished by the time of cycle 4, the CGID pointer will not advance past instruction 2 until a later cycle, when instruction 3 finishes. In the example, this occurs in cycle 6, when instruction 3 finishes, completes and executes.

Note that the example also illustrates that completion of instructions may occur before they are executed, i.e., before their specified operations are performed in the execution unit to which they are issued.

According to the structure and process of the embodiment, as has been herein set forth, it should be understood that it is unnecessary to sustain resources for backtracking to an earlier processor state for instructions that have completed or cancelled. These resources include history buffer entries for instructions dispatched with the same GID as their associated interruptible instruction which has completed or cancelled. Therefore, in response to completion of an instruction, any history buffer entries for the instruction and noninterruptible instructions with the same GID are retired (i.e., released, i.e., deallocated). If an interruptible instruction is cancelled, rather than completing, history buffer entries for the instruction and subsequent instructions having the corresponding GID are deallocated, just as in the case of completion; however, additional entries must also be deallocated—namely, entries for instructions which follow the cancelled instruction but do not have the same GID as the cancelled instruction. Details of such history buffer deallocation are set out in one or more of the above cross referenced applications.

Note also that noninterruptible instructions dispatched after a first interruptible instruction but before any other interruptible instruction are in the same dispatch group as the first interruptible instruction, i.e., are associated with the first interruptible instruction's GID, so they are also considered complete when the first interruptible instruction is complete. Thus, the noninterruptible instructions also complete independently of their execution, i.e., they complete in response to checking which may occur prior to their execution.

It should also be understood that since their completion depends solely on that of the interruptible instruction in their dispatch group, which was dispatched preceding their own dispatch, noninterruptible instructions may complete, and their history buffer entries be released, even before they are dispatched. Furthermore, in selected instances, history buffer entries are not generated for a noninterruptible instruction, even though the instruction targets one or more architected registers. (Details of this are described in one or more of the above cross referenced applications.) Therefore, since an IIT entry is not generated at all for a noninterruptible instruction, in the selected no history buffer cases noninterruptible instructions will use neither an IIT nor a history buffer resource. Also, for such selected noninterruptible instructions, since according to the present embodiment of the invention, an execution unit produces a result for an instruction and immediately broadcasts the result for affected architected registers, only the affected architected register or registers will be devoted to the instruction once the execution unit is released for such a selected noninterruptible instruction. And, of course, the architected register or registers will be released in response to the register snooping the broadcasted execution result of the next dispatched instruction which targets the same register or registers.

It is common in the prior art that instruction throughput is limited, at least in some respects, by the size of the completion buffer. The selective creation of IIT entries and the deallocation of IIT and history buffer entries in response to completion, in accordance with the present invention, uses less resources and releases such resources sooner than similar resources are released in the prior art, where deallocation includes waiting for writeback. Because of this, the present invention allows more instructions to be concurrently executed with a given size IIT.

As previously stated, the invention is not limited to the details of the embodiment described above, and is capable of use in various other combinations and modifications within the scope of the inventive concept as expressed herein. The invention is intended to be defined broadly in accordance with the following claims.

What is claimed is:

1. In a data processing system, a method for allocating resources to instruction processing, comprising the steps of:

assigning tags to instructions dispatched for processing;

snooping by a processor resource to obtain execution results for the instructions;

grouping the instructions, a group having solely a single interruptible instruction, and further including non-interruptible instructions dispatched following the interruptible instruction with no intervening dispatched interruptible instruction;

finishing such an interruptible instruction in response to determining that it will not cause an interrupt, and completing the interruptible instruction in response to finishing all earlier dispatched instructions; and finishing and completing such a non-interruptible instruction in response to completing its associated interruptible instruction, so that such a non-interruptible instruction may complete before it is dispatched.

2. The method of claim 1, comprising the steps of:

entering information solely for interruptible ones of the instructions in a completion queue in response to dispatching the interruptible instructions; and releasing such an instruction's completion queue entry in response to its completion, so that for such an interruptible instruction, which completes before it executes, the interruptible instruction's completion queue entry may be released before the interruptible instruction executes, and for non-interruptible instructions, no completion queue entry is used.

3. The method of claim 1, comprising the steps of:

entering information for the instructions in a rename buffer in response to the instructions targeting an architected register; and releasing the rename buffer entries for the instructions in such a group in response to completing the interruptible instruction of the group.

4. The method of claim 3, comprising the step of:

entering information in a completion queue solely for the instructions which are interruptible, in response to dispatching the instructions.

5. The method of claim 4, comprising the step of:

releasing the completion queue buffer entry for such an interruptible instruction in response to its completion.

6. The method of claim 4, wherein the information entered in the completion queue includes an address for the interruptible instruction, and comprising the step of:

refetching the instructions of the group with which the interruptible instruction is associated in response to the address in the completion queue for the interruptible instruction and the instruction's interruption.

7. In a data processing system, a apparatus for allocating resources to instruction processing, comprising:

means for assigning tags to instructions dispatched for processing;

means for snooping by a processor resource to obtain execution results for the instructions;

means for grouping the instructions, a group having solely a single interruptible instruction, and further including non-interruptible instructions dispatched following the interruptible instruction with no intervening dispatched interruptible instruction;

means for finishing such an interruptible instruction in response to determining that it will not cause an interrupt, and completing the interruptible instruction in response to finishing all earlier dispatched instructions; and means for finishing and completing such a non-interruptible instruction in response to completing its associated interruptible instruction, so that such a non-interruptible instruction may complete before it is dispatched.

8. The apparatus of claim 7, comprising:

means for entering information solely for interruptible ones of the instructions in a completion queue in response to dispatching the interruptible instructions; and means for releasing such an instruction's completion queue entry in response to its completion, so that for such an interruptible instruction, which completes before it executes, the interruptible instruction's completion queue entry may be released before the interruptible instruction executes, and for non-interruptible instructions, no completion queue entry is used.

9. The apparatus of claim 7, comprising:

means for entering information for the instructions in a rename buffer in response to the instructions targeting an architected register; and means for releasing the rename buffer entries for the instructions in such a group in response to completing the interruptible instruction of the group.

10. The apparatus of claim 9, comprising:

means for entering information in a completion queue solely for the instructions which are interruptible, in response to dispatching the instructions.

11. The apparatus of claim 10, comprising:

means for releasing the completion queue buffer entry for such an interruptible instruction in response to its completion.

12. The apparatus of claim 10, wherein the information entered in the completion queue includes an address for the interruptible instruction, and comprising:

means for refetching the instructions of the group with which the interruptible instruction is associated in response to the address in the completion queue for the interruptible instruction and the instruction's interruption.

13. The apparatus of claim 7, wherein the means for grouping instruction includes means for grouping a number of noninterruptible instructions.

14. In a data processing system, a method for allocating resources to instruction processing, comprising the steps of:

tagging instructions dispatched for processing;

snooping by a processor resource to obtain execution results for the tagged instructions;

finishing such an instruction in response to determining that it will not cause an interrupt, and completing the instruction in response to finishing all earlier dispatched instructions, so that such an instruction may complete before its execution;

entering information for such an instruction in a rename buffer in response to the instruction targeting an architected register; and releasing such a rename buffer entry in response completing the entry's instruction, wherein the rename buffer comprises a history buffer, and entering the information in the history buffer is further in response to whether the instruction is among selected ones of the dispatched instructions, so that in the instance of a noninterruptible instruction for which no history buffer information is entered, an architected register may be the sole resource devoted to the instruction after an execution unit has executed the instruction.

15. In a data processing system, a method for allocating resources to instruction processing, comprising the steps of:

tagging instructions dispatched for processing;

snooping by a processor resource to obtain execution results for the tagged instructions;

finishing such an instruction in response to determining that it will not cause an interrupt, and completing the instruction in response to finishing all earlier dispatched instructions, so that such an instruction may complete before its execution;

entering information for the instructions in a completion queue in response to dispatching the instructions; and releasing such an instruction's completion queue entry in response to its completion, wherein the releasing of the completion queue entry is independent of writing the instruction's result to the resource.

16. In a data processing system, apparatus for allocating resources to instruction processing comprising:

means for tagging instructions dispatched for processing;

means for snooping by a processor resource to obtain execution results for the tagged instructions;

means for finishing such an instruction in response to determining that it will not cause an interrupt, and completing the instruction in response to finishing all earlier dispatched instructions, so that such an instruction may complete before its execution;

means for entering information for such an instruction in a rename buffer in response to the instruction targeting an architected register; and means for releasing such a rename buffer entry in response completing the entry's instruction, wherein the rename buffer comprises a history buffer, and the means for entering the information in the history buffer is responsive to whether the instruction is among selected ones of the dispatched instructions, so that in the instance of a noninterruptible instruction for which no history buffer information is entered, an architected register may be the sole resource devoted to the instruction after an execution unit has executed the instruction.

17. In a data processing system, apparatus for allocating resources to instruction processing comprising:

means for tagging instructions dispatched for processing;

means for snooping by a processor resource to obtain execution results for the tagged instructions;

means for finishing such an instruction in response to determining that it will not cause an interrupt, and completing the instruction in response to finishing all earlier dispatched instructions, so that such an instruction may complete before its execution;

means for entering information for the instructions in a completion queue in response to dispatching the instructions;

means for releasing such an instruction's completion queue entry in response to its completion; and means for writing the instruction's result to the resource, wherein the means for releasing the completion queue entry is independent of the means for writing the instruction's result to the resource.

\* \* \* \* \*